United States Patent
Watanabe et al.

(10) Patent No.: US 12,022,036 B2
(45) Date of Patent: Jun. 25, 2024

(54) INFORMATION PROCESSING DEVICE, CONTROL METHOD, PRINTING SYSTEM, AND COMPUTER PROGRAM DISPLAYING SHAPE OF A TRAY AS BACKGROUND AND A PLURALITY OF EDIT AREAS OF IMAGES TO BE PRINTED ON PRINT MEDIA LOADED IN TRAY

(71) Applicant: SEIKO EPSON CORPORATION, Tokyo (JP)

(72) Inventors: Yusuke Watanabe, Matsumoto (JP); Tomohiro Kiyotaki, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 18/455,030

(22) Filed: Aug. 24, 2023

(65) Prior Publication Data
US 2024/0073332 A1    Feb. 29, 2024

(30) Foreign Application Priority Data
Aug. 25, 2022    (JP) ................. 2022-133929

(51) Int. Cl.
H04N 1/00    (2006.01)
(52) U.S. Cl.
CPC ..... *H04N 1/00445* (2013.01); *H04N 1/00456* (2013.01); *H04N 1/00482* (2013.01); *H04N 1/00503* (2013.01); *H04N 1/00538* (2013.01); *H04N 1/00557* (2013.01)

(58) Field of Classification Search
CPC .......... H04N 1/00161; H04N 1/00167; H04N 1/00663; H04N 1/00482; H04N 1/00503; H04N 1/0044–00456; H04N 1/00538; H04N 1/00557; H04N 1/00588; H04N 1/00604; H04N 1/00623; H04N 1/0066
See application file for complete search history.

(56) References Cited

U.S. PATENT DOCUMENTS

| | | | |
|---|---|---|---|
| 10,362,188 B2 * | 7/2019 | Sakai | B41J 3/4071 |
| 10,397,422 B2 * | 8/2019 | Nagai | G06F 3/1205 |
| 2007/0188808 A1 | 8/2007 | Tsuboi | |
| 2017/0346966 A1 | 11/2017 | Suzuki | |

FOREIGN PATENT DOCUMENTS

| | | |
|---|---|---|
| JP | 2007219744 A | 8/2007 |
| JP | 2017215752 A | 12/2017 |

* cited by examiner

*Primary Examiner* — Scott A Rogers
(74) *Attorney, Agent, or Firm* — CHIP LAW GROUP

(57) ABSTRACT

An information processing device includes a display and a second controller that causes the display to display an edit screen including a first image edit area and a second image edit area for receiving an edit to an image. The second controller causes a stair image, which resembles the shape of a media tray to be inserted into a printing device, to be displayed as a background image of the edit screen. Images displayed in the first image edit area and the second image edit area are associated with images to be printed on a plurality of print media loaded in the media tray, the association being based on the location of the stair image relative to the first image edit area and the second image edit area.

10 Claims, 8 Drawing Sheets

INFORMATION PROCESSING DEVICE, CONTROL METHOD, PRINTING SYSTEM, AND COMPUTER PROGRAM DISPLAYING SHAPE OF A TRAY AS BACKGROUND AND A PLURALITY OF EDIT AREAS OF IMAGES TO BE PRINTED ON PRINT MEDIA LOADED IN TRAY

The present application is based on, and claims priority from JP Application Serial Number 2022-133929, filed Aug. 25, 2022, the disclosure of which is hereby incorporated by reference herein in its entirety.

BACKGROUND

1. Technical Field

The present disclosure relates to an information processing device, a printing system, a storage medium, and a method for controlling an information processing device.

2. Related Art

An information processing device that edits an image to be printed by a printing device is known.

For example, JP-A-2007-219744 discloses a printing system including a printing device and an information processing device. The printing device performs printing on a printed object. The information processing device transmits print information for the printing device to perform printing on the printed object.

The information processing device includes edit information processing means, display means, and print information generating means. The edit information processing means is means that generates or processes edit information, which is information to be used when printing on the same printed object is performed multiple times, regarding editing of the layout of the printed object.

The display means is means for displaying the edit information, which has been generated or processed by the edit information processing means, on the edit screen.

The print information generating means is means that generates print information based on the edit information in response to a user requesting that printing on the printed object be performed.

However, if a plurality of images are to be displayed in a plurality of respective edit areas, these images are to be edited, and the edited images are to be printed on print media, it is difficult to check images to be printed on the print media loaded in the tray of the printing device against the images displayed in the plurality of respective edit areas. Therefore, improvement in the convenience of the user is desirable.

SUMMARY

The present disclosure is an information processing device including a display and a controller configured to cause the display to display an edit screen including a plurality of edit areas for receiving an edit to an image. The controller is configured to cause a shape image to be displayed as a background image of the edit screen. The shape image resembles a shape of at least a portion of a tray to be inserted into the printing device. Images displayed in the plurality of edit areas are associated with images to be printed on a plurality of print media loaded in the tray, the association being based on a location of the shape image relative to the plurality of edit areas.

The present disclosure is a printing system including a printing device and an information processing device that generates print data to be printed by the printing device. The information processing device includes a display and a controller configured to cause the display to display an edit screen including a plurality of edit areas for receiving an edit to an image, to generate a plurality of pieces of print data based on an image edited in each of the plurality of edit areas, and to transmit the plurality of pieces of print data to the printing device. The controller is configured to cause a shape image to be displayed as a background image of the edit screen, the shape image resembling a shape of at least a portion of a tray to be inserted into the printing device. Images displayed in the plurality of edit areas are associated with images to be printed on a plurality of print media loaded in the tray, the association being based on a location of the shape image relative to the plurality of edit areas.

The present disclosure is a non-transitory computer-readable storage medium storing a program that causes a computer to execute: a procedure of causing a display to display an edit screen including a plurality of edit areas for receiving an edit to an image, a procedure of generating a plurality of pieces of print data based on an image edited in each of the plurality of edit areas, and a procedure of transmitting the plurality of pieces of print data to a printing device. In the edit screen, a shape image is displayed as a background image of the edit screen. The shape image resembles a shape of at least a portion of a tray to be inserted into the printing device. Images displayed in the plurality of edit areas are associated with images to be printed on a plurality of print media loaded in the tray, the association being based on a location of the shape image relative to the plurality of edit areas.

The present disclosure is a method for controlling an information processing device. The method includes causing a display to display an edit screen including a plurality of edit areas for receiving an edit to an image, generating a plurality of pieces of print data based on an image edited in each of the plurality of edit areas, and transmitting the plurality of pieces of print data to a printing device. In the edit screen, a shape image is displayed as a background image of the edit screen. The shape image resembles a shape of at least a portion of a tray to be inserted into the printing device. Images displayed in the plurality of edit areas are associated with images to be printed on a plurality of print media loaded in the tray, the association being based on a location of the shape image relative to the plurality of edit areas.

DESCRIPTION OF EMBODIMENTS

1. System Configuration

Figure 1:
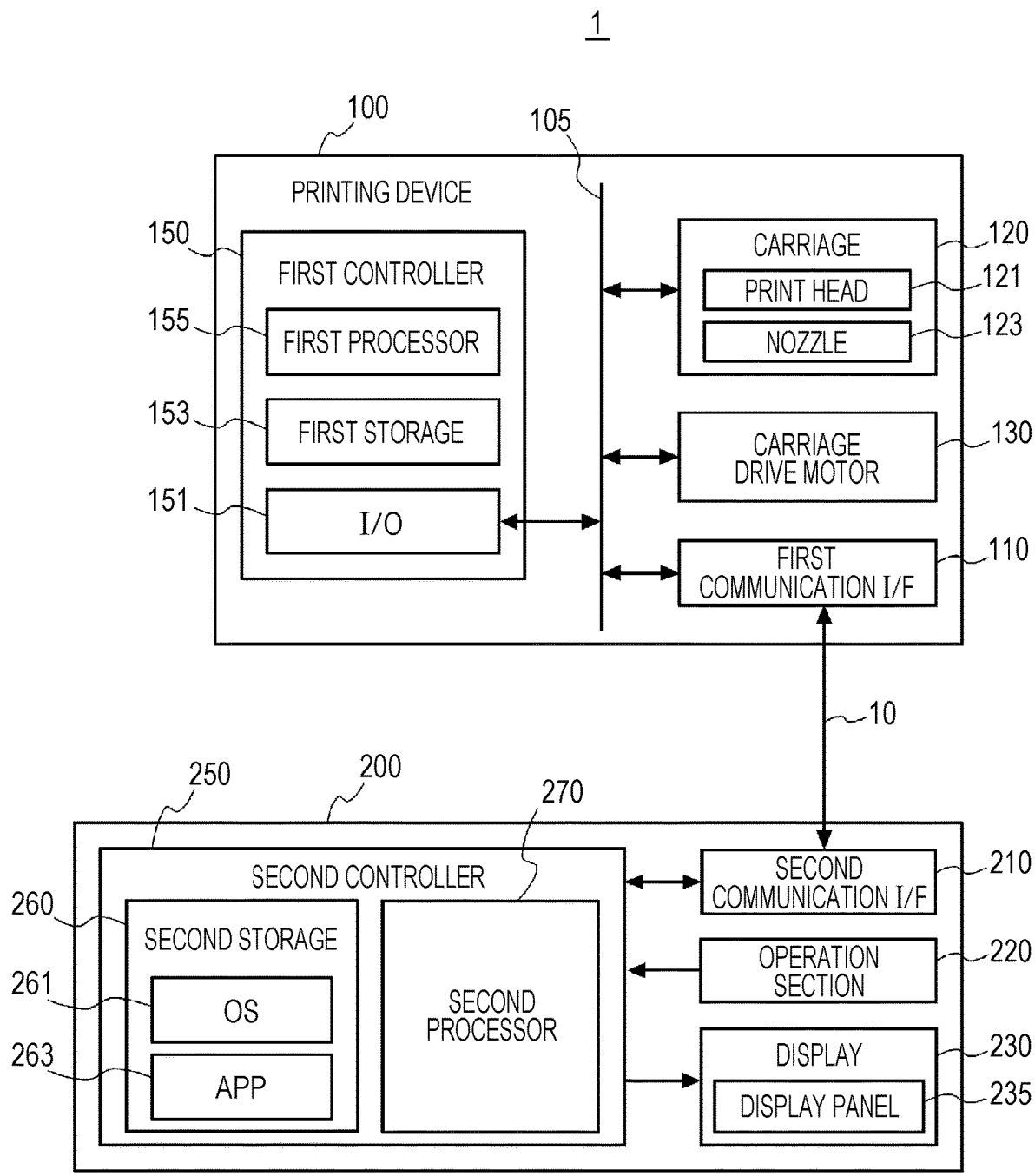
FIG. 1 is a diagram illustrating a system configuration of a printing system.

FIG. 1 is a diagram illustrating a system configuration of a printing system 1.

The printing system 1 includes a printing device 100 and an information processing device 200.

The printing device 100 receives print data from the information processing device 200 and prints an image based on the received print data on print media.

The information processing device 200 generates print data to be printed by the printing device 100 and transmits the generated print data to the printing device 100.

Regarding the printing system 1 according to the present embodiment, a description will be given of an example in which the printing device 100 and the information processing device 200 are coupled in a wired manner by a cable 10; however, the printing device 100 and the information processing device 200 may be coupled wirelessly using Wi-Fi, Bluetooth, or other wireless technology. Wi-Fi and Bluetooth are registered trademarks.

2. Configuration of Printing Device

The configuration of the printing device 100 will be described.

The printing device 100 includes a first communication interface 110, a carriage 120, a carriage drive motor 130, and a first controller 150. Hereafter, "interface" will be abbreviated to "I/F".

The first communication I/F 110 is coupled via the cable 10 to the information processing device 200 and performs data communication to and from the information processing device 200. The first communication I/F 110 is, for example, a wired interface including a connection terminal, such as a universal serial bus (USB) connector or an Ethernet connector, and an interface circuit. Ethernet is a registered trademark.

The carriage 120 includes a print head 121 and nozzles 123.

The print head 121, which is, for example, configured with a piezoelectric element, extrudes ink supplied from a black ink cartridge and color ink cartridges to eject the ink as minute particles from the nozzles 123. The ink ejected from the nozzles 123 is attached onto the surface of a print medium to form a character, an image, or the like.

Under control of the first controller 150, the carriage drive motor 130 causes the carriage 120 to move backwards and forwards in the main scanning direction.

The first controller 150 includes an input-output I/F 151, a first storage 153, and a first processor 155. The input-output I/F 151 will be denoted as an I/O 151.

The I/O 151 is coupled to a bus 105 and performs mutual data communication with the first communication I/F 110 and the carriage 120 that are coupled to the bus 105.

The first storage 153 includes a read-only memory (ROM) and a random-access memory (RAM). The ROM stores firmware and various types of setting information. The RAM is used as an operation area of the first processor 155.

The first processor 155 is a processing device such as a central processing unit (CPU) or a microprocessor unit (MPU). The first processor 155 may be a single processor or may be comprised of multiple processors.

3. Configuration of Information Processing Device

The configuration of the information processing device 200 will now be described.

The information processing device 200 is, for example, a notebook, desktop, or tablet personal computer. In addition, the information processing device 200 may be a smartphone.

The information processing device 200 includes a second communication I/F 210, an operation section 220, a display 230, and a second controller 250. The operation section 220 corresponds to a receiver, and the second controller 250 corresponds to a controller.

The second communication I/F 210 is coupled via the cable 10 to the printing device 100 and performs data communication to and from the printing device 100. The second communication I/F 210 is, for example, a wired interface including a connection terminal, such as a USB connector or an Ethernet connector, and an interface circuit.

The operation section 220 includes, for example, input devices such as a keyboard and a mouse, and receives an operation of the user. The operation section 220 outputs an operation signal corresponding to a received operation to the second controller 250.

The display 230 includes a display panel 235 and displays an APP screen 300 including a media setting screen 310, an edit screen 330, and the like, which are described later, on the display panel 235 under control of the second controller 250.

As the display panel 235, for example, a liquid crystal panel or an organic electroluminescent (EL) panel is used.

The second controller 250 is a computer device including a second storage 260 and a second processor 270.

The second storage 260 includes a ROM and a RAM. The ROM stores an operating system (OS) 261 and an application program 263. Hereafter, the application program 263 will be denoted as an APP 263.

In addition, the second storage 260 may include an auxiliary storage device, such as a solid state drive (SSD) or a hard disk drive (HDD).

The APP 263 according to the present embodiment is an app for generating print data to be printed by the printing device 100. In particular, the APP 263 is an app that generates a card by causing the printing device 100 to print the print data, and is an app capable of receiving editing of an image to be printed on a card, settings of the printing device 100, and so on. The card is, for example, a business card or an identification (ID) card made of resin.

The second processor 270 is a processing device such as a CPU or an MPU. The second processor 270 may be a single processor or may be comprised of a plurality of processors.

4. Operations of Information Processing Device

Figure 2:
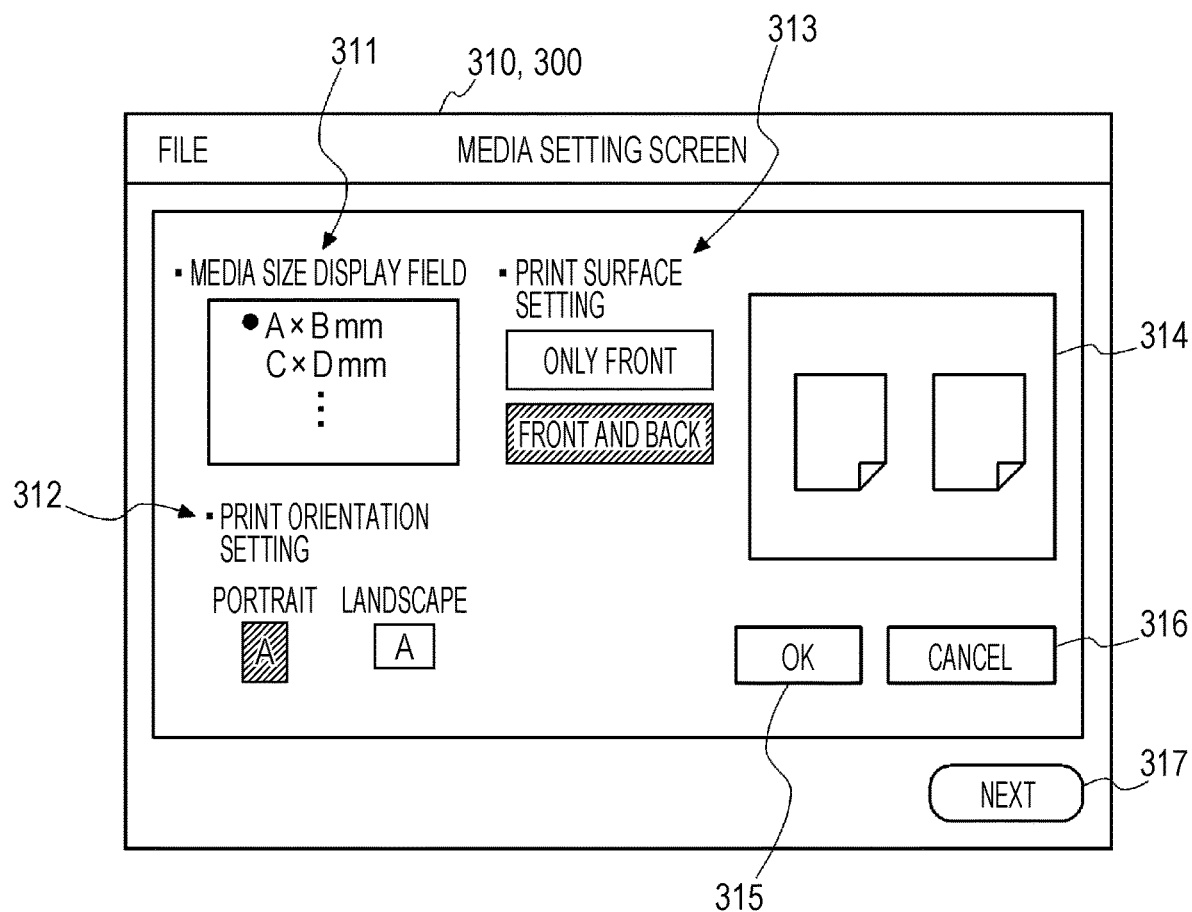
FIG. 2 illustrates an example of a media setting screen.
Figure 3:
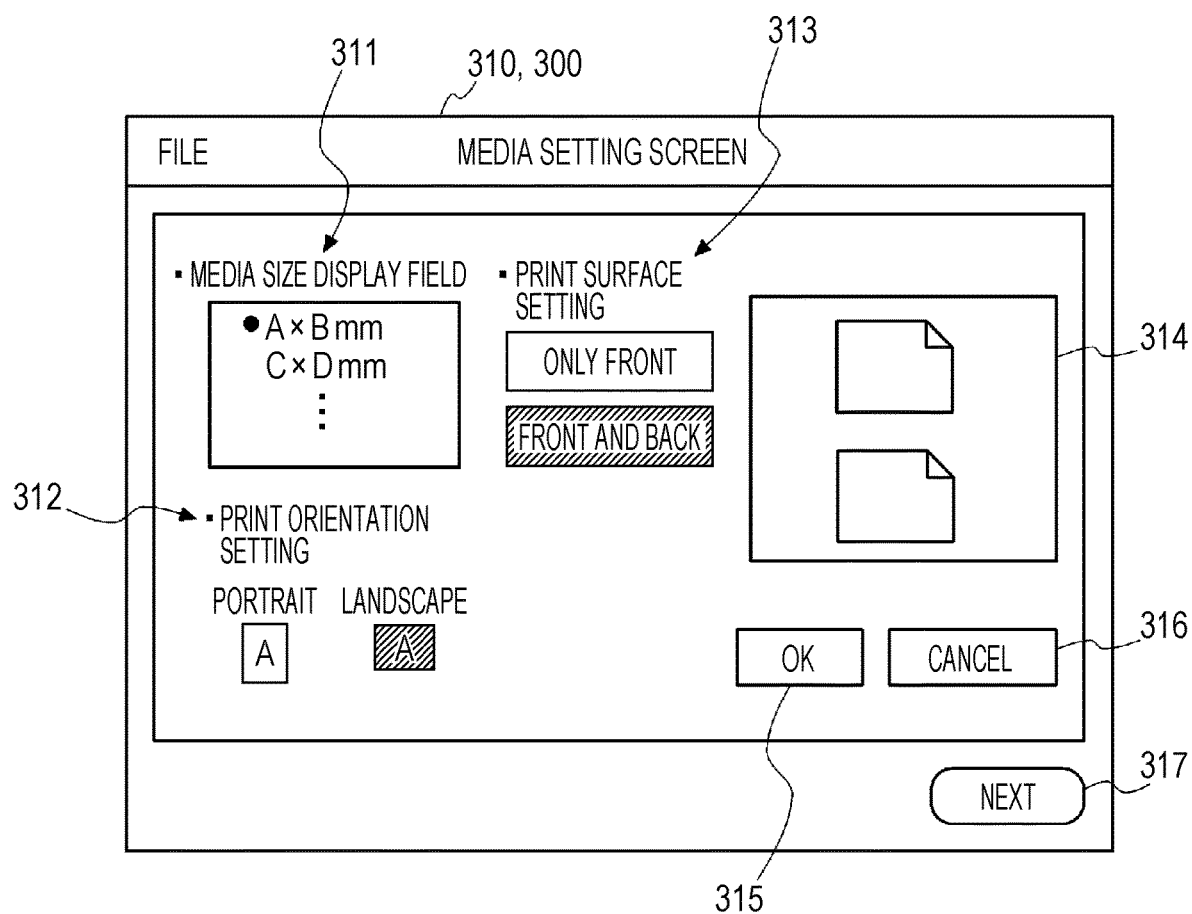
FIG. 3 illustrates another example of the media setting screen.

FIG. 2 and FIG. 3 each illustrate the APP screen 300 that is displayed on the display panel 235 when the second processor 270 executes the APP 263.

In response to the APP 263 being selected through a user operation, the second processor 270 executes the selected APP 263 to cause the display panel 235 to display the APP screen 300.

In FIG. 2 and FIG. 3, the media setting screen 310 for receiving settings for the print media is illustrated as an example of the APP screen 300.

In the media setting screen 310, a media size display field 311, a print orientation setting 312, a print surface setting 313, an icon display field 314, an OK button 315, a cancel button 316, a next button 317, and so on are displayed.

In the media size display field 311, for example, information, such as the sizes of cards that are the print media, is displayed as a list. In addition, in the media size display field 311, information, such as the size of a card selected by the user, is displayed. The settings in the media size display field 311 are changed in response to an input operation performed on an input device of the operation section 220.

The print orientation setting 312 receives a setting regarding whether an image is to be printed on the print media in portrait orientation or in landscape orientation. The setting in the print orientation setting 312 is changed in response to an input operation performed on the input device of the operation section 220.

Portrait orientation printing is performed in accordance with a setting for printing an image on the print media such that the vertical side of the image is longer than the horizontal side of the image. Landscape orientation printing is performed in accordance with a setting for printing an image on the print media such that the horizontal side of the image is longer than the vertical side of the image.

The print surface setting 313 receives a choice between single-sided printing, in which an image is printed on only one side of the print media, and double-sided printing, in which an image is printed on both sides of the print media. The print surface setting 313 is changed in response to an input operation performed on the input device of the operation section 220.

In the icon display field 314, an icon of the print media corresponding to a setting in the print surface setting 313 is displayed. If single-sided printing is selected, an icon indicating the single-sided printing is displayed in the icon display field 314. In contrast, if double-sided printing is selected, an icon indicating the double-sided printing is displayed in the icon display field 314. FIG. 2 and FIG. 3 illustrate examples where folded corner icons, each displaying sheets with folded corners, are displayed as icons indicating double-sided printing.

In addition, FIG. 2 illustrates the display state of the icon display field 314 when the portrait orientation printing is chosen, and FIG. 3 illustrates the display state of the icon display field 314 when the landscape orientation printing is chosen.

When the print orientation setting 312 is set to the portrait orientation printing, icons are displayed in portrait orientation as illustrated in FIG. 2. When the print orientation setting 312 is set to the landscape orientation printing, an icon is displayed in landscape orientation as illustrated in FIG. 3.

When the media size display field 311, the print orientation setting 312, and the print surface setting 313 of the media setting screen 310, for example, are set and the OK button 315 is pressed, the second processor 270 saves the settings of the media size display field 311, the print orientation setting 312, and the print surface setting 313. In addition, in response to the next button 317 being pressed, the second processor 270 causes the edit screen 330 to be displayed as the APP screen 300 on the display panel 235.

Figure 4:
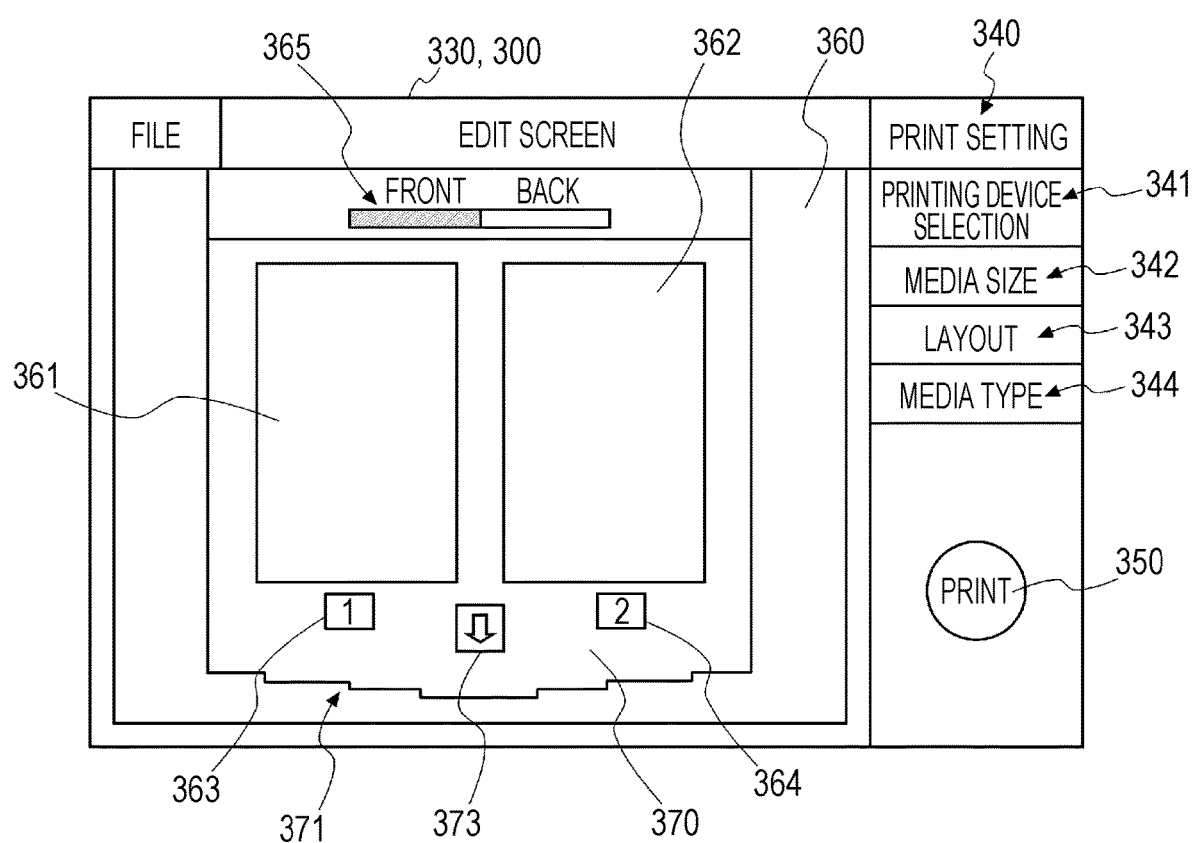
FIG. 4 illustrates an edit screen in portrait orientation printing.

FIG. 4 illustrates an example of the edit screen 330 when the portrait orientation printing is chosen in the print orientation setting 312.

In the edit screen 330, a print setting area 340, a print button 350, and an image edit area 360 are displayed.

In the print setting area 340, which is an area for print settings of the printing device 100, for example, setting items such as a printing device selection 341, a media size 342, a layout 343, and a media type 344 are included.

The printing device selection 341 is an item for selecting the printing device 100 that is to perform printing operations.

The media size 342 is an item for selecting the size of the print media.

The layout 343 is an item for setting the layout of the print media.

The media type 344 is an item for selecting the type of the print media.

In the image edit area 360, two areas, a first image edit area 361 and a second image edit area 362, are displayed. The first image edit area 361 corresponds to a first edit area, and the second image edit area 362 corresponds to a second edit area. The first image edit area 361 and the second image edit area 362 correspond to a plurality of edit areas.

In the present embodiment, simultaneous editing and printing of two cards is basic processing, and editing and printing of a single card is advanced processing. Therefore, the image edit area 360 including two areas, the first image edit area 361 and the second image edit area 362, is displayed in the edit screen 330.

When a media tray 170 described later is capable of receiving simultaneous loading of (2+N) cards, where N is an integer greater than or equal to one, image edit areas from the third image edit area to the (2+N)th image edit area, in addition to the first image edit area 361 and the second image edit area 362, are simultaneously displayed in the image edit area 360.

In addition, identification information 363 is displayed in proximity to the first image edit area 361. In the present embodiment, as seen on the figure, the identification information 363 is displayed below the first image edit area 361. The numerical value displayed in the identification information 363 corresponds to the identification information displayed in a first loading section 171 of the media tray 170 illustrated in FIG. 5.

Similarly, identification information 364 is displayed in proximity to the second image edit area 362. In the present embodiment, as seen on the figure, the identification information 364 is displayed below the second image edit area 362. The numerical value displayed in the identification information 364 corresponds to the identification information displayed in a second loading section 172 of the media tray 170 illustrated in FIG. 5.

An image displayed in the first image edit area 361 is referred to as a first image, and an image displayed in the second image edit area 362 is referred to as a second image. The user edits an image to be printed on cards, which are the print media, by pasting a photograph and the like and inputting a character and the like in the first image edit area 361 and the second image edit area 362.

In the image edit area 360, a processing surface indicator 365 is included.

The processing surface indicator 365 is an indicator representing whether the images displayed in the first image edit area 361 and the second image edit area 362 are front side images or back side images.

When the user chooses printing on both the front and back sides of the print media in the print surface setting 313 in the media setting screen 310 in FIG. 2, the user edits images of both the front and back sides of the print media. However, only either the front side images or the back side images are displayed in the first image edit area 361 and the second image edit area 362.

Therefore, the user visually recognizes the processing surface indicator 365 to verify whether the images displayed in the first image edit area 361 and the second image edit area 362 are the front side images or the back side images.

In addition, in the image edit area 360, a background image 370 is included.

The background image 370 is an image that is displayed as a background of the first image edit area 361 and the second image edit area 362.

The background image 370 includes a stair image 371 that is an image having stair-like cutouts, and an arrow image 373 indicating an insertion direction in which the media tray 170 is to be inserted into the printing device 100. The stair image 371 corresponds to a shape image. The arrow image 373 corresponds to an image indicating an insertion direction.

When the portrait orientation printing is selected, the stair image 371 and the arrow image 373 are displayed below the first image edit area 361 and the second image edit area 362 as seen on the figure.

Figure 5:
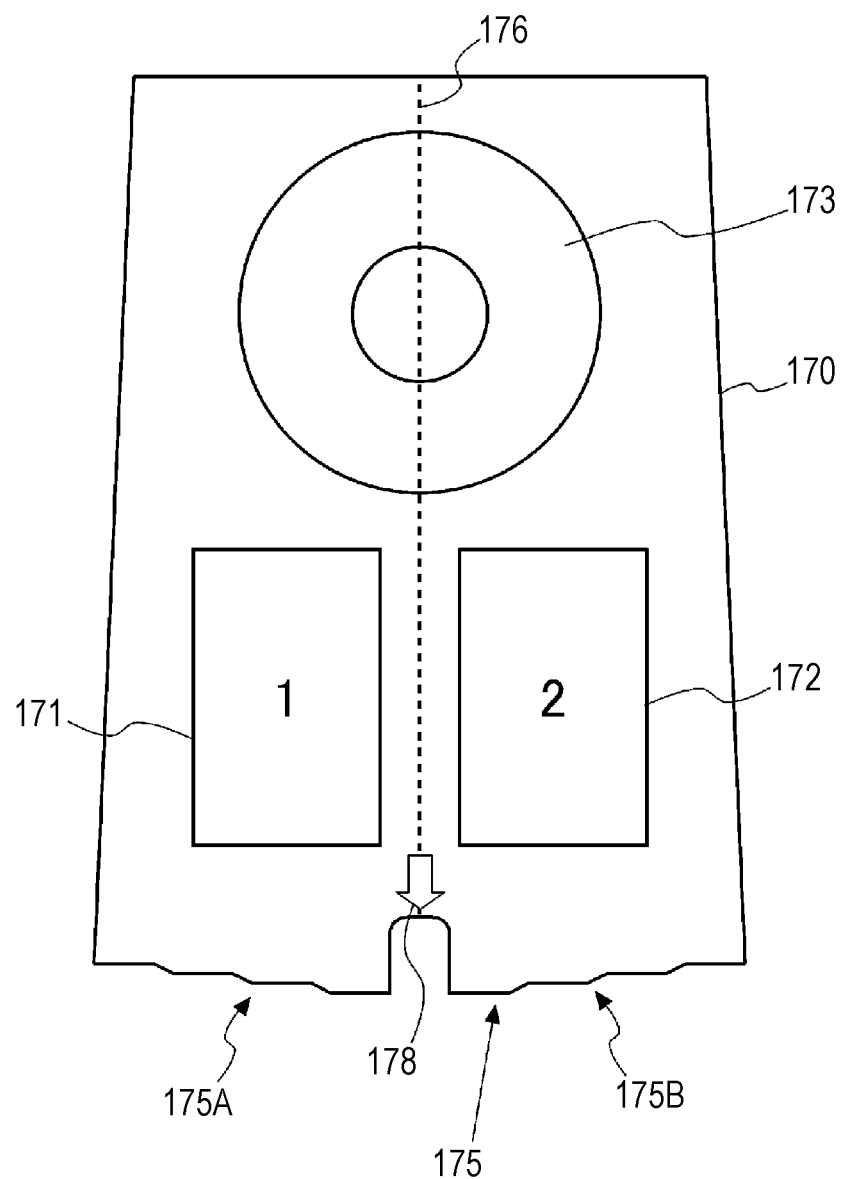
FIG. 5 illustrates the shape of a media tray.

FIG. 5 illustrates the media tray 170 in which cards are to be loaded.

Here, with reference to FIG. 5, the configuration of the media tray 170 will be described.

In the media tray 170, the first loading section 171 and the second loading section 172 are formed in rectangular shapes. The first loading section 171 is loaded with the print media on which the first image displayed in the first image edit area 361 is to be printed, and the second loading section 172 is loaded with the print media on which the second image displayed in the second image edit area 362 is to be printed. Therefore, a numerical value "1" is formed as identification information in the first loading section 171, and a numerical value "2" is formed as identification information in the second loading section 172.

The numerical value "1" displayed as identification information in the first loading section 171 is the same value as the numerical value indicated by the identification information 363 displayed in proximity to the first image edit area 361.

The numerical value "2" displayed as identification information in the second loading section 172 is the same value as the numerical value indicated by the identification information 364 displayed in proximity to the second image edit area 362.

The first loading section 171 and the second loading section 172 are formed on one side in the longitudinal direction of the media tray 170, and a third loading section 173 for loading a compact disc recordable (CD-R) is formed on the other side in the longitudinal direction.

The first loading section 171 and the second loading section 172 are formed in the media tray 170 such that the longitudinal direction of the media tray 170 is parallel to the long sides of the first loading section 171 and the second loading section 172. In addition, the first loading section 171 and the second loading section 172 are formed in the media tray 170 such that the long sides are parallel and the short sides are parallel.

In addition, the short side 175 of the media tray 170 on the one side, on which the first loading section 171 and the second loading section 172 are arranged, is formed in a stair-like level-difference shape.

In the example illustrated in FIG. 5, along a center line 176 of the short side of the media tray 170, a left-side portion 175A of the short side 175 and a right-side portion 175B of the short side 175 are symmetrical in shape as seen on the figure. The number of steps of the level-difference shape in the left-side portion 175A and the right-side portion 175B of the short side 175 is arbitrary.

Figure 6:
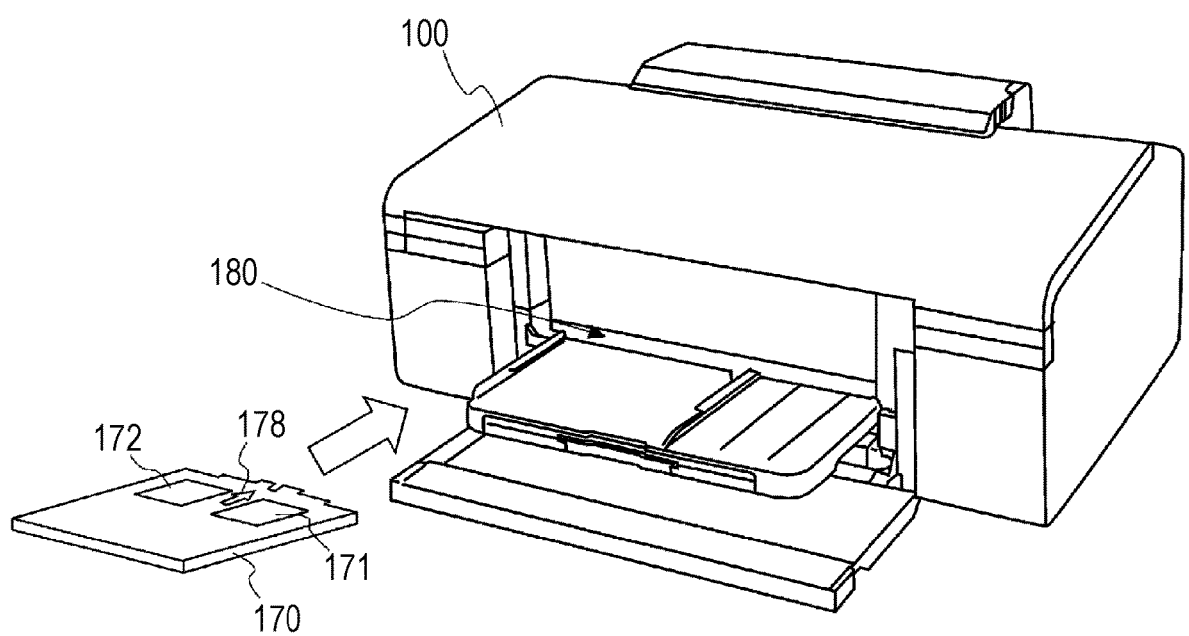
FIG. 6 illustrates the media tray being set into a printing device.

FIG. 6 illustrates the media tray 170 being inserted into a tray insertion slot 180 of the printing device 100.

In addition, the media tray 170 is provided with an arrow image 178 indicating an insertion direction in which the media tray 170 is to be inserted into the tray insertion slot 180 of the printing device 100. When the media tray 170 is inserted into the tray insertion slot 180 in the arrow direction indicated by the arrow image 178, the media tray 170 is successfully inserted into the tray insertion slot 180.

Referring back to FIG. 4, the stair image 371 displayed in the background image 370 is an image resembling the stair-like level-difference shape formed in the short side 175 of the media tray 170.

In addition, the arrow image 373 is formed at a location in the image edit area 360 so as to correspond to the arrow image 178 formed in the media tray 170.

By comparing the location of the stair image 371 displayed in the background image 370 with the location of the stair-like level-difference shape formed in the short side 175 of the media tray 170, the user may easily recognize that the first image edited in the first image edit area 361 is to be printed on the print media loaded in the first loading section 171 of the media tray 170.

Similarly, by comparing the location of the stair image 371 displayed in the background image 370 with the location of the stair-like level-difference shape formed in the short side 175 of the media tray 170, the user may easily recognize that the second image edited in the second image edit area 362 is to be printed on the print media loaded in the second loading section 172 of the media tray 170.

Similarly, by comparing the direction of the arrow image 373 displayed in the background image 370 and the identification information 363, 364 with the direction of the arrow image 178 formed in the media tray 170 and the numerical values displayed as identification information, the user may easily recognize that the first image edited in the first image edit area 361 is to be printed on the print media loaded in the first loading section 171 of the media tray 170.

Similarly, by comparing the direction of the arrow image 373 displayed in the background image 370 and the identification information 363, 364 with the direction of the arrow image 178 formed in the media tray 170 and the numerical values displayed as identification information, the user may easily recognize that the second image edited in the second image edit area 362 is to be printed on the print media loaded in the second loading section 172 of the media tray 170.

Figure 7:
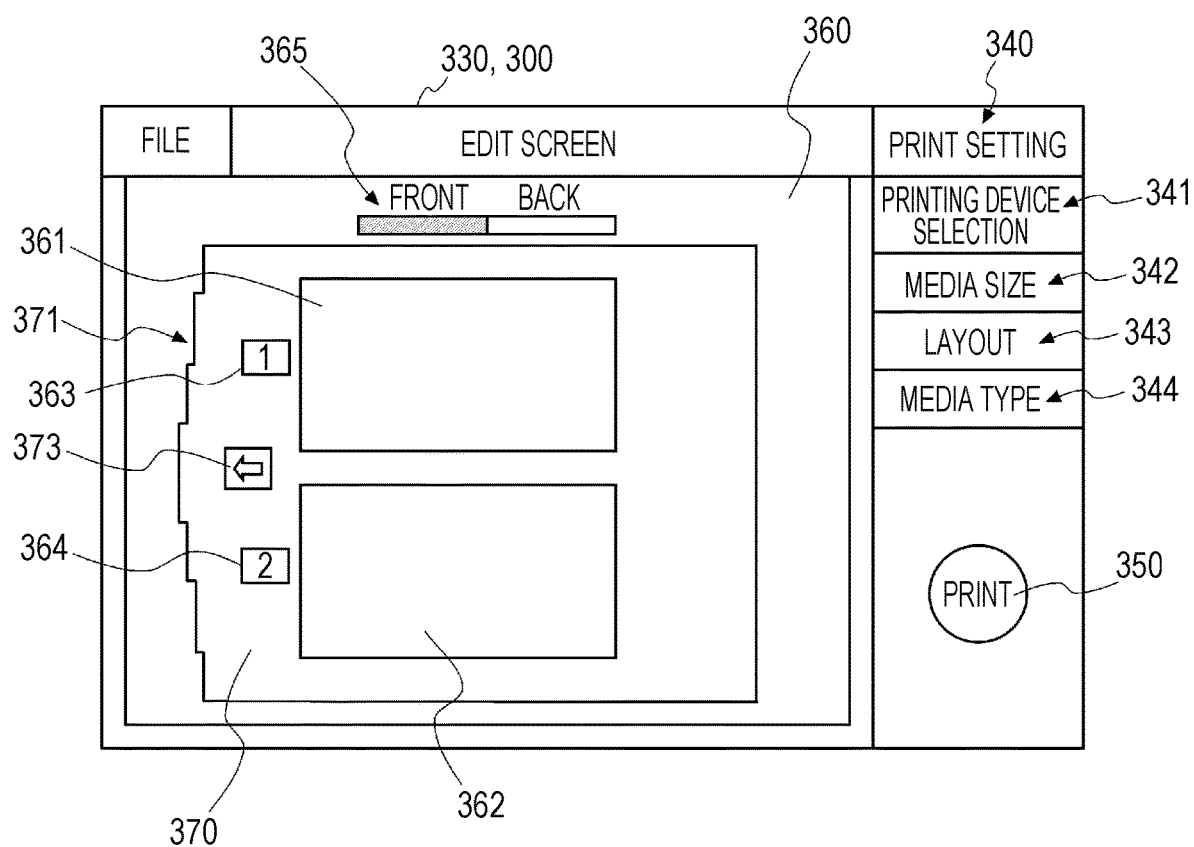
FIG. 7 illustrates an edit screen in landscape orientation printing.

FIG. 7 illustrates an example of the edit screen 330 when the landscape orientation printing is chosen in the print orientation setting 312.

The difference between the edit screen 330 in the portrait orientation printing illustrated in FIG. 4 and the edit screen 330 in the landscape orientation printing illustrated in FIG. 7 lies in the display locations in the image edit area 360 of the first and second image edit areas 361, 362 and the background image 370 in the edit screen 330.

In the case of the edit screen 330 in the portrait orientation printing, the first image edit area 361 and the second image edit area 362 are displayed such that, as seen on the figure, the long sides of the first image edit area 361 and the second image edit area 362 are parallel to the vertical direction of the image edit area 360.

In the case of the edit screen 330 in the landscape orientation printing, the first image edit area 361 and the second image edit area 362 are displayed such that, as seen on the figure, the long sides of the first image edit area 361 and the second image edit area 362 are parallel to the horizontal direction of the image edit area 360.

In addition, in the case of the edit screen 330 in the portrait orientation printing illustrated in FIG. 4, as seen on the figure, the stair image 371 is displayed below the first image edit area 361 and the second image edit area 362. In the case of the edit screen 330 in the landscape orientation printing illustrated in FIG. 7, as seen on the figure, the stair image 371 is displayed to the left of the first image edit area 361 and the second image edit area 362.

Figure 8:
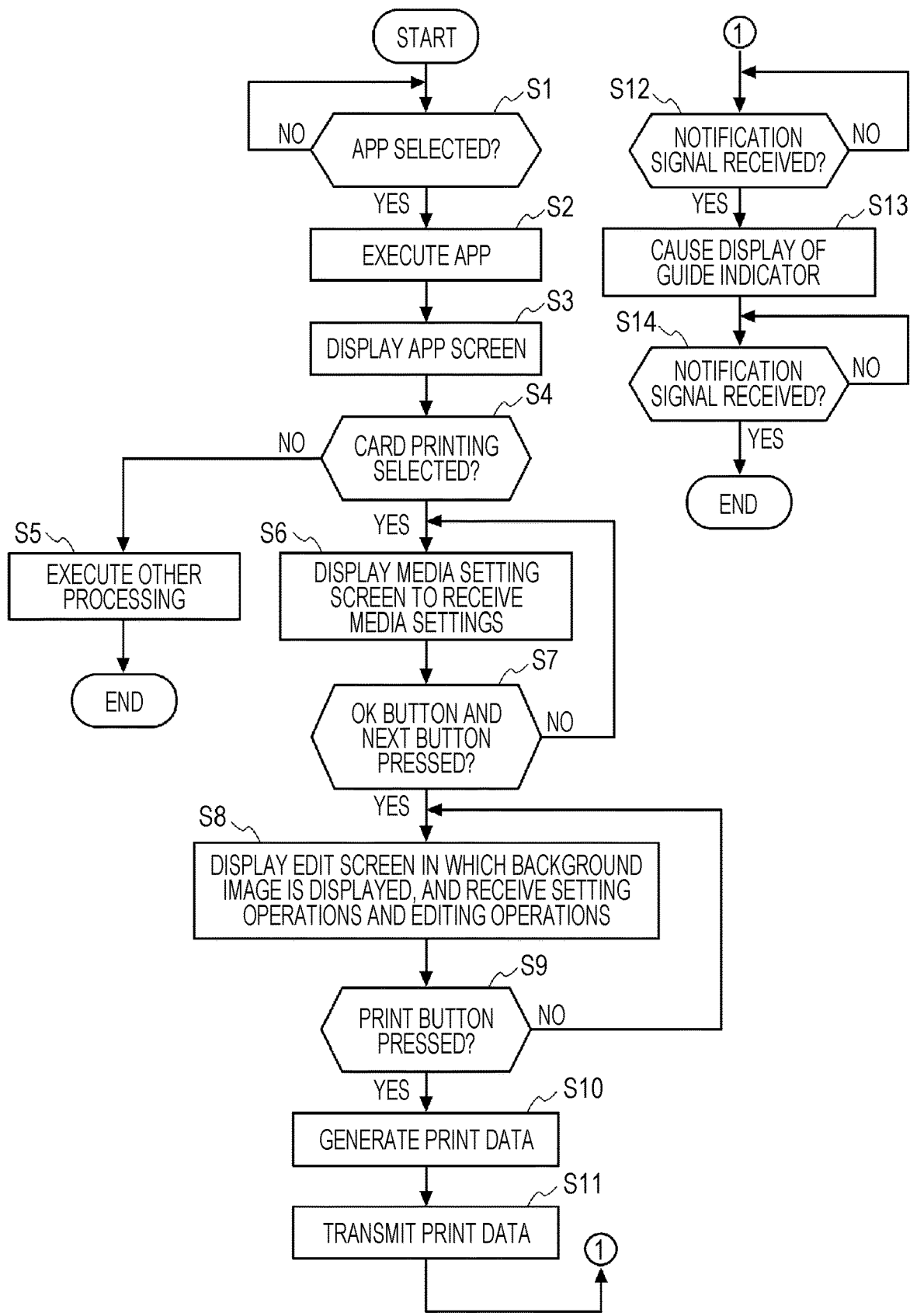
FIG. 8 is a flowchart illustrating operations of an information processing device.

FIG. 8 is a flowchart illustrating operations of the information processing device 200.

With reference to the flowchart illustrated in FIG. 8, operations of the information processing device 200 will be described.

The second controller 250 determines whether the APP 263 has been selected (step S1). If the APP 263 has not been selected (No in step S1), the second controller 250 waits until the APP 263 is selected.

If the APP 263 has been selected (Yes in step S1), the second controller 250 executes the selected APP 263 (step S2) to cause the APP screen 300 to be displayed on the display panel 235 (step S3).

The second controller 250 determines whether card printing has been selected (step S4). If card printing has not been selected (No in step S4), the second controller 250 executes processing corresponding to a selected setting (step S5) and terminates the process flow.

If the card printing has been selected (Yes in step S4), the second controller 250 causes the media setting screen 310 illustrated in FIG. 2 or FIG. 3 to be displayed on the display panel 235 to receive media settings for the media size display field 311, the print orientation setting 312, the print surface setting 313, and so on (step S6).

Then, the second controller 250 determines whether the OK button 315 and the next button 317 in the media setting screen 310 have been pressed (step S7). If the OK button 315 and the next button 317 in the media setting screen 310 have not been pressed (No in step S7), the second controller 250 waits until these buttons are pressed.

If the OK button 315 and the next button 317 of the media setting screen 310 have been pressed (Yes in step S7), the second controller 250 causes the edit screen 330 illustrated in FIG. 4 to be displayed on the display panel 235 (step S8). The edit screen 330 includes the background image 370. The background image 370 includes the stair image 371, which is an image having stair-like cutouts, and the arrow image 373, which indicates an insertion direction in which the media tray 170 is to be inserted into the printing device 100.

The second controller 250 receives editing operations on the first image and the second image in the image edit area 360 and print settings, such as the media size 342, the layout 343, and the media type 344, in the print setting area 340 (step S8).

Then, the second controller 250 determines whether the print button 350 has been pressed (step S9). If the print button 350 has not been pressed (No in step S9), the second controller 250 waits until the print button 350 is pressed.

In addition, if the print button 350 has been pressed (Yes in step S9), the second controller 250 generates print data of each of the first image edited in the first image edit area 361 and the second image edited in the second image edit area 362 (step S10).

The second controller 250 transmits the generated print data to the printing device 100 (step S11).

The user loads print media in the first loading section 171 and the second loading section 172 of the media tray 170. Next, the user inserts the media tray 170 into the tray insertion slot 180 of the printing device 100 in the arrow direction indicated by the arrow image 178.

When the media tray 170 is correctly inserted into the tray insertion slot 180, the printing device 100 performs printing based on print data received from the information processing device 200 such that the first image, which is a front side image, is printed on the print media loaded in the first loading section 171 and the second image, which is a front side image, is printed on the print media loaded in the second loading section 172. Upon completion of printing of the first image, which is a front side image, and the second image, which is a front side image, the printing device 100 transmits, to the information processing device 200, a notification signal that provides a notification of completion of printing of the front side of the print media.

The second controller 250 determines whether the notification signal, which provides a notification of completion of printing on the front side, has been received from the printing device 100 (step S12). If the notification signal has not been received (No in step S12), the second controller 250 waits until the notification signal is received.

If the notification signal has been received from the printing device 100 (Yes in step S12), the second controller 250 causes display of a guidance indicator that guides the user to remove the media tray 170 from the printing device 100 and to turn over the print media loaded in the first loading section 171 and the print media loaded in the second loading section 172 (step S13). Then, the second controller 250 determines whether a notification signal that provides a notification of printing completion has been received from the printing device 100 (step S14).

When the media tray 170 loaded with the turned-over print media is correctly inserted into the tray insertion slot 180, the printing device 100 performs printing based on print data received from the information processing device 200 such that the first image, which is a back side image, is printed on the print media loaded in the first loading section 171 and the second image, which is a back side image, is printed on the print media loaded in the second loading section 172. Upon completion of printing of the first image, which is a front side image, and the second image, which is a front side image, the printing device 100 transmits, to the information processing device 200, a notification signal that provides a notification of the printing completion.

If the notification signal that provides a notification of the printing completion has not been received from the printing device 100 (No in step S14), the second controller 250 waits until the notification signal is received.

If the notification signal from the printing device 100 has been received (Yes in step S14), the second controller 250 terminates the process flow.

5. Overview of Present Disclosure

The following appendices provide an overview of the present disclosure.

Appendix 1: An information processing device comprising:
 a display; and
 a controller configured to cause the display to display an edit screen including a plurality of edit areas for receiving an edit to an image, wherein
 the controller is configured to cause a shape image to be displayed as a background image of the edit screen, the shape image resembling a shape of at least a portion of a tray to be inserted into a printing device, and
 images displayed in the plurality of edit areas are associated with images to be printed on a plurality of print media loaded in the tray, the association being based on a location of the shape image relative to the plurality of edit areas.

According to this configuration, by using the shape of the tray corresponding to the shape image and the location of the shape image relative to the plurality of edit areas, the images displayed in the plurality of edit areas may be checked against the images to be printed on the plurality of print media loaded in the tray. Therefore, the convenience of the user may be improved.

Appendix 2: The information processing device according to appendix 1, wherein
the shape image is an image resembling a shape of a side of the tray to be inserted into the printing device, and
the controller is configured to:
when images are to be printed on the print media by performing portrait orientation printing, cause the shape image to be displayed below the plurality of edit areas, and
when images are to be printed on the print media by performing landscape orientation printing, cause the shape image to be displayed to left of the plurality of edit areas.

According to this configuration, the shape image is displayed below the plurality of edit areas when images are to be printed on the print media by performing portrait orientation printing, and the shape image is displayed to the left of the plurality of edit areas when images are to be printed on the print media by performing landscape orientation printing. Therefore, even when images are to be printed on the print media by performing portrait orientation printing, or even when images are to be printed on the print media by performing landscape orientation printing, the images displayed in the plurality of edit areas may be checked against the images to be printed on the plurality of print media loaded in the tray.

Appendix 3: The information processing device according to appendix 1 or 2, wherein
the controller is configured to cause an image of a side including a stair-like level difference to be displayed as the shape image.

According to this configuration, the image of a side including a stair-like level difference is displayed as the image resembling the shape of the tray. Therefore, by using the image of the side of the tray to be inserted into the printing device, images displayed in the plurality of edit areas may easily be checked against images to be printed on the plurality of print media loaded in the tray.

Appendix 4: The information processing device according to any one of appendices 1 to 3, wherein
the controller is configured to cause the display to display the edit screen including a first edit area in which a first image is displayed and a second edit area in which a second image is displayed,
for the first edit area, identification information indicating a first loading area of the tray is displayed, the first loading area being to be loaded with a print medium on which the first image is to be printed, and
for the second edit area, identification information indicating a second loading area of the tray is displayed, the second loading area being to be loaded with a print medium on which the second image is to be printed.

According to this configuration, for the first edit area, identification information indicating the first loading area of the tray is displayed, and, for the second edit area, identification information indicating the second loading area of the tray is displayed. The first loading area is to be loaded with a print medium on which the first image is to be printed. The second loading area is to be loaded with a print medium on which the second image is to be printed. Therefore, images displayed in the plurality of edit areas may easily be checked against images to be printed on the plurality of print media loaded in the tray.

Appendix 5: The information processing device according to any one of appendices 1 to 4, wherein
the shape image is an image resembling a shape of a side of the tray to be inserted into the printing device, and
the controller is configured to cause the display to display the background image including the image resembling the shape of the side of the tray and an image indicating an insertion direction in which the side of the tray is to be inserted into the printing device.

According to this configuration, the background image is displayed. The background image includes the image resembling the shape of the side of the tray and the image indicating an insertion direction in which the side of the tray is to be inserted into the printing device. Therefore, by using the image resembling the shape of the side of the tray to be inserted into the printing device and the image indicating the insertion direction, the images displayed in the plurality of edit areas may easily be checked against the images to be printed on the plurality of print media loaded in the tray.

Appendix 6: The information processing device according to any one of appendices 1 to 5, wherein
the controller is configured to cause the display to display the edit screen including an indicator representing whether the images displayed in the plurality of edit areas are front side images or back side images.

According to this configuration, the indicator is displayed in the edit screen. The indicator represents whether the images displayed in the plurality of edit areas are front side images or back side images. Therefore, the user may easily determine whether images being edited are front side images or back side images.

Appendix 7: The information processing device according to any one of appendices 1 to 6, further comprising
a receiver configured to receive an operation, wherein
the controller is configured to switch, through an operation received by the receiver, a display state of images displayed in the plurality of edit areas between a portrait display in which vertical sides of the images are displayed longer than horizontal sides of the images and a landscape display in which the horizontal sides of the images are displayed longer than the vertical sides of the images.

According to this configuration, through an operation received by the receiver, the display state of the images displayed in the plurality of edit areas may be switched between the portrait display and the landscape display. Therefore, the convenience of the user may be improved.

Appendix 8: A printing system comprising a printing device and an information processing device that generates print data to be printed by the printing device, the information processing device including
a display; and
a controller configured to cause the display to display an edit screen including a plurality of edit areas for receiving an edit to an image, to generate a plurality of pieces of print data based on an image edited in each of the plurality of edit areas, and to transmit the plurality of pieces of print data to the printing device, wherein
the controller is configured to cause a shape image to be displayed as a background image of the edit screen, the shape image resembling a shape of at least a portion of a tray to be inserted into the printing device, and
images displayed in the plurality of edit areas are associated with images to be printed on a plurality of print media loaded in the tray, the association being based on a location of the shape image relative to the plurality of edit areas.

According to this configuration, by using the shape of the tray corresponding to the shape image and the location of the shape image relative to the plurality of edit areas, the images displayed in the plurality of edit areas may be checked against the images to be printed on the plurality of print media loaded in the tray. Therefore, the convenience of the user may be improved.

Appendix 9: A non-transitory computer-readable storage medium storing a program that causes a computer to execute:
- a procedure of causing a display to display an edit screen including a plurality of edit areas for receiving an edit to an image,
- a procedure of generating a plurality of pieces of print data based on an image edited in each of the plurality of edit areas, and
- a procedure of transmitting the plurality of pieces of print data to a printing device, wherein
- in the edit screen, a shape image is displayed as a background image of the edit screen, the shape image resembling a shape of at least a portion of a tray to be inserted into the printing device, and
- images displayed in the plurality of edit areas are associated with images to be printed on a plurality of print media loaded in the tray, the association being based on a location of the shape image relative to the plurality of edit areas.

According to this configuration, by using the shape of the tray corresponding to the shape image and the location of the shape image relative to the plurality of edit areas, the images displayed in the plurality of edit areas may be checked against the images to be printed on the plurality of print media loaded in the tray. Therefore, the convenience of the user may be improved.

Appendix 10: A method for controlling an information processing device, comprising:
- causing a display to display an edit screen including a plurality of edit areas for receiving an edit to an image;
- generating a plurality of pieces of print data based on an image edited in each of the plurality of edit areas; and
- transmitting the plurality of pieces of print data to a printing device, wherein
- in the edit screen, a shape image is displayed as a background image of the edit screen, the shape image resembling a shape of at least a portion of a tray to be inserted into the printing device, and
- images displayed in the plurality of edit areas are associated with images to be printed on a plurality of print media loaded in the tray, the association being based on a location of the shape image relative to the plurality of edit areas.

According to this configuration, by using the shape of the tray corresponding to the shape image and the location of the shape image relative to the plurality of edit areas, the images displayed in the plurality of edit areas may be checked against the images to be printed on the plurality of print media loaded in the tray. Therefore, the convenience of the user may be improved.

6. Other Configurations

The embodiment described above is a desired embodiment of the present disclosure. However, the present disclosure is not limited to the embodiment described above and may be implemented in various modifications without departing from the spirit and scope of the present disclosure. For example, the functional units of the printing device 100 and the information processing device 200 illustrated in FIG. 1 indicate the functional configuration, and their specific implementation forms are not particularly limited. That is, hardware individually corresponding to the functional units need not be implemented, and the configuration may be such that the functions of a plurality of functional units are implemented by a single processor executing a program. In addition, some of the functions implemented by software in the embodiment described above may be implemented by hardware. In addition, some of the functions implemented by hardware may be implemented by software. Furthermore, the specific detailed configurations of the other components of the information processing device 200 may be arbitrarily changed without departing from the spirit and scope of the present disclosure.

In addition, if the printing device 100 includes a display, the edit screen 330 displayed when the OK button 315 is pressed may be transmitted to the printing device 100 and the edit screen 330 may be displayed on the display of the printing device 100.

According to this configuration, with the display of the printing device 100, the user may check images displayed in the plurality of edit areas against images to be printed on the plurality of print media loaded in the tray.

In addition, when the user presses the OK button 315 or the next button 317 in the edit screen 330, a diagram illustrating the media tray 170 being inserted into the tray insertion slot 180 of the printing device 100, as in FIG. 6, may be displayed as a pop-up.

According to this configuration, the user may check the shape of the media tray 170 and the direction in which the media tray 170 is inserted into the tray insertion slot 180 of the printing device 100.

In addition, the processing units of the flowchart illustrated in FIG. 8 are divided according to the main processing contents to ease understanding of the processing of the information processing device 200. The present disclosure will not be limited by how the processing units of the flowchart in FIG. 8 are divided and what the processing units are named. In addition, according to the processing content, the processing of the information processing device 200 may be divided into more processing units or may be divided such that one processing unit includes more processing. In addition, the order of processing of the flowchart described above is not limited to the example illustrated in the figures.

In addition, when a method and a program for controlling the information processing device 200 are implemented using a computer included in the information processing device 200, a program to be executed by the computer may be provided in the form of a recording medium or a transmission medium that transmits the program. As the recording medium, a magnetic or optical recording medium or a semiconductor memory device may be used. Specifically, examples of the recording medium include portable or fixed recording media such as a floppy disk, a hard disk drive (HDD), a compact disc read-only memory (CD-ROM), a digital versatile disc (DVD), a Blu-ray disc, a magneto-optical disc, a flash memory, and a card type recording medium. In addition, the recording medium mentioned above may be a nonvolatile storage device, such as a RAM, ROM, or HDD, which is an internal storage device included in a server device. Blu-ray is a registered trademark.

What is claimed is:

1. An information processing device, comprising:
   a display; and
   a controller configured to cause the display to display an edit screen including a plurality of edit areas for receiving an edit to an image, wherein
   the controller is configured to cause a shape image to be displayed as a background image of the edit screen, the shape image resembling a shape of at least a portion of a tray to be inserted into a printing device, and
   images displayed in the plurality of edit areas are associated with images to be printed on a plurality of print media loaded in the tray, the association being based on a location of the shape image relative to the plurality of edit areas.

2. The information processing device according to claim 1, wherein
   the shape image is an image resembling a shape of a side of the tray to be inserted into the printing device, and
   the controller is configured to:
      when images are to be printed on the print media by performing portrait orientation printing, cause the shape image to be displayed below the plurality of edit areas, and
      when images are to be printed on the print media by performing landscape orientation printing, cause the shape image to be displayed to left of the plurality of edit areas.

3. The information processing device according to claim 1, wherein
   the controller is configured to cause an image of a side including a stair-like level difference to be displayed as the shape image.

4. The information processing device according to claim 1, wherein
   the controller is configured to cause the display to display the edit screen including a first edit area in which a first image is displayed and a second edit area in which a second image is displayed,
   for the first edit area, identification information indicating a first loading area of the tray is displayed, the first loading area being to be loaded with a print medium on which the first image is to be printed, and
   for the second edit area, identification information indicating a second loading area of the tray is displayed, the second loading area being to be loaded with a print medium on which the second image is to be printed.

5. The information processing device according to claim 1, wherein
   the shape image is an image resembling a shape of a side of the tray to be inserted into the printing device, and
   the controller is configured to cause the display to display the background image including the image resembling the shape of the side of the tray and an image indicating an insertion direction in which the side of the tray is to be inserted into the printing device.

6. The information processing device according to claim 1, wherein
   the controller is configured to cause the display to display the edit screen including an indicator representing whether the images displayed in the plurality of edit areas are front side images or back side images.

7. The information processing device according to claim 1, further comprising:
   a receiver configured to receive an operation, wherein
   the controller is configured to switch, through the operation received by the receiver, a display state of the images displayed in the plurality of edit areas between a portrait display in which vertical sides of the images are displayed longer than horizontal sides of the images and a landscape display in which the horizontal sides of the images are displayed longer than the vertical sides of the images.

8. A printing system comprising a printing device and an information processing device that generates print data to be printed by the printing device,
   the information processing device including
   a display; and
   a controller configured to cause the display to display an edit screen including a plurality of edit areas for receiving an edit to an image, to generate a plurality of pieces of print data based on an image edited in each of the plurality of edit areas, and to transmit the plurality of pieces of print data to the printing device, wherein
   the controller is configured to cause a shape image to be displayed as a background image of the edit screen, the shape image resembling a shape of at least a portion of a tray to be inserted into the printing device, and
   images displayed in the plurality of edit areas are associated with images to be printed on a plurality of print media loaded in the tray, the association being based on a location of the shape image relative to the plurality of edit areas.

9. A non-transitory computer-readable storage medium storing a program that causes a computer to execute:
   a procedure of causing a display to display an edit screen including a plurality of edit areas for receiving an edit to an image,
   a procedure of generating a plurality of pieces of print data based on an image edited in each of the plurality of edit areas, and
   a procedure of transmitting the plurality of pieces of print data to a printing device, wherein
   in the edit screen, a shape image is displayed as a background image of the edit screen, the shape image resembling a shape of at least a portion of a tray to be inserted into the printing device, and
   images displayed in the plurality of edit areas are associated with images to be printed on a plurality of print media loaded in the tray, the association being based on a location of the shape image relative to the plurality of edit areas.

10. A method for controlling an information processing device, comprising:
    causing a display to display an edit screen including a plurality of edit areas for receiving an edit to an image;
    generating a plurality of pieces of print data based on an image edited in each of the plurality of edit areas; and
    transmitting the plurality of pieces of print data to a printing device, wherein
    in the edit screen, a shape image is displayed as a background image of the edit screen, the shape image resembling a shape of at least a portion of a tray to be inserted into the printing device, and
    images displayed in the plurality of edit areas are associated with images to be printed on a plurality of print media loaded in the tray, the association being based on a location of the shape image relative to the plurality of edit areas.

* * * * *